United States Patent [19]

Van de Pas

[11] Patent Number: 4,983,964
[45] Date of Patent: Jan. 8, 1991

[54] SYSTEM FOR DATA TRANSMISSION

[75] Inventor: Leo Van de Pas, Merksem, Belgium

[73] Assignee: Elektriciteit Voor Goederenbehandling Marine en Industrie, in het verkart "Egemin", naamloze vennootschap, Schoten, Belgium

[21] Appl. No.: 212,791

[22] Filed: Jun. 29, 1988

[30] Foreign Application Priority Data

Jul. 1, 1987 [BE] Belgium ............... 8700738

[51] Int. Cl.$^5$ .............. G08C 19/06; G01F 23/26
[52] U.S. Cl. .............. 340/870.31; 73/304 C; 324/127
[58] Field of Search .............. 340/870.31, 623, 624, 340/870.37, 620; 73/309, 308, 291, 292, 304 C, 290 R; 324/127, 58 R, 61 R; 374/142

[56] References Cited

U.S. PATENT DOCUMENTS

| | | | |
|---|---|---|---|
| 2,750,794 | 6/1956 | Downs | 374/142 |
| 3,512,408 | 5/1970 | Douglass | 374/142 |
| 3,969,941 | 7/1976 | Rapp | 73/290 R |
| 3,974,695 | 8/1976 | Lerner | 73/304 C |
| 4,236,144 | 11/1980 | Sunagawa | 340/623 |
| 4,263,587 | 4/1981 | John | 340/620 |
| 4,309,655 | 1/1982 | Lienhard | 324/127 |
| 4,515,015 | 5/1985 | Kuhlman | 73/304 C |
| 4,571,998 | 2/1986 | Stegner | 340/624 |
| 4,676,101 | 6/1987 | Baughman | 73/304 C |
| 4,697,183 | 9/1987 | Jenning et al. | 340/870.31 |
| 4,831,327 | 5/1989 | Chenier et al. | 324/127 |

FOREIGN PATENT DOCUMENTS

| | | | |
|---|---|---|---|
| 222573 | 10/1942 | Switzerland . | |
| 511707 | 12/1973 | U.S.S.R. | 340/870.31 |
| 2046912 | 11/1980 | United Kingdom . | |

OTHER PUBLICATIONS

English translation of VDI-Nachrichten, vol. 20, No. 45, Nov. 9, 1966, p. 14; G. Ferner; "Fernwirktechnik in Der Industrie", p. 14, col. 1, lines 25-33, Col. 4, line 15—Col. 6, line 4, figure.

Primary Examiner—Donald J. Yusko
Assistant Examiner—Yuk H. Lau
Attorney, Agent, or Firm—Foley & Lardner, Schwartz, Jeffery, Schwaab, Mack, Blumenthal & Evans

[57] ABSTRACT

A system for the transmission of data in a measuring instrument includes a measuring device is being introduced in a medium in order to measure specific properties thereof and with which these measuring data are being transmitted. The system includes autonomous and active measuring device; a freely movable electrically conductive element with which the measuring device is connected; a signal receiving unit where through or along which, the electrically conductive element, without making physical or galvanic contact, can move freely; a signal processing unit which is electrically connected with the signal receiving unit and a direct or indirect electric connection between the electrically conductive and freely movable element and the medium to be tested.

20 Claims, 1 Drawing Sheet

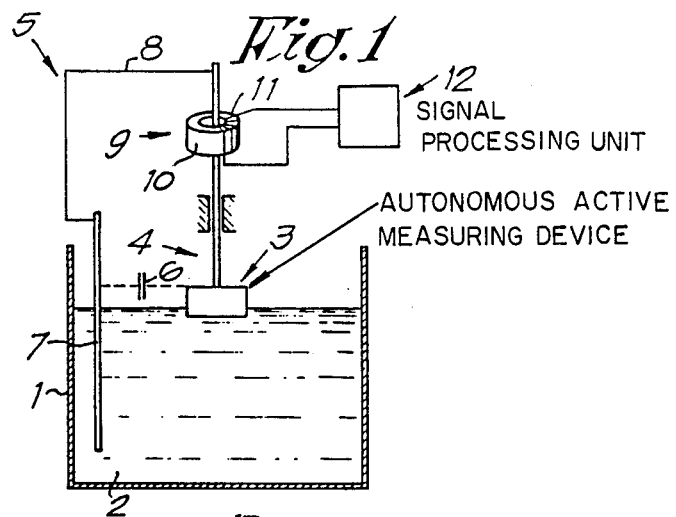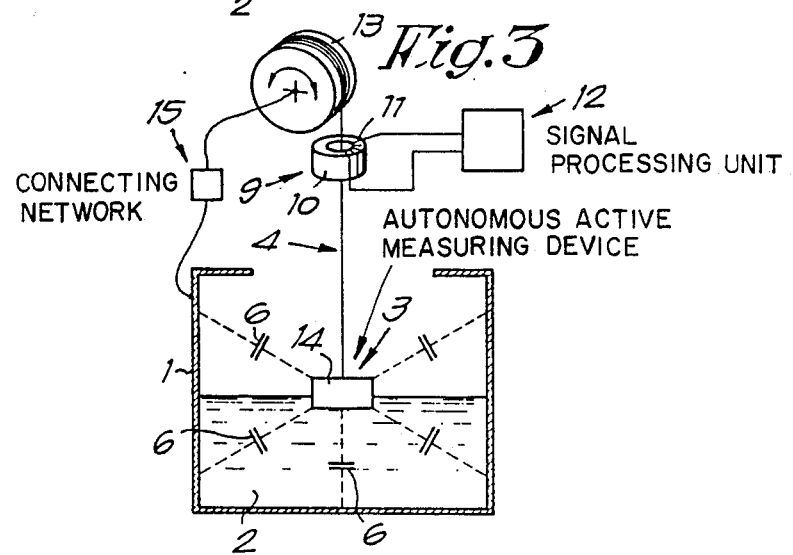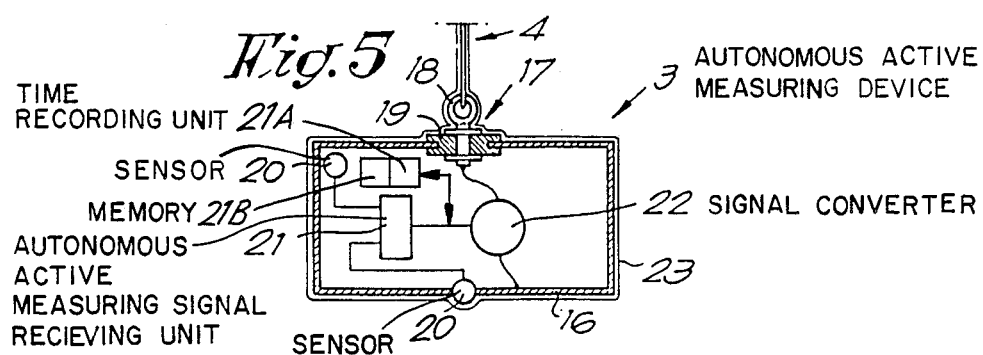

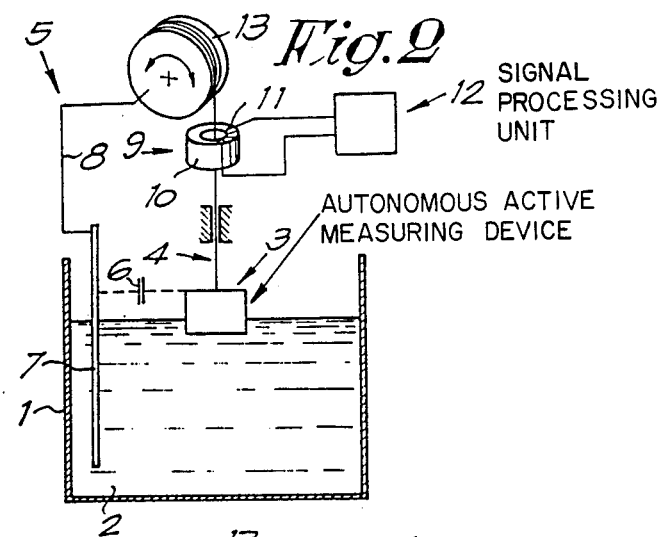
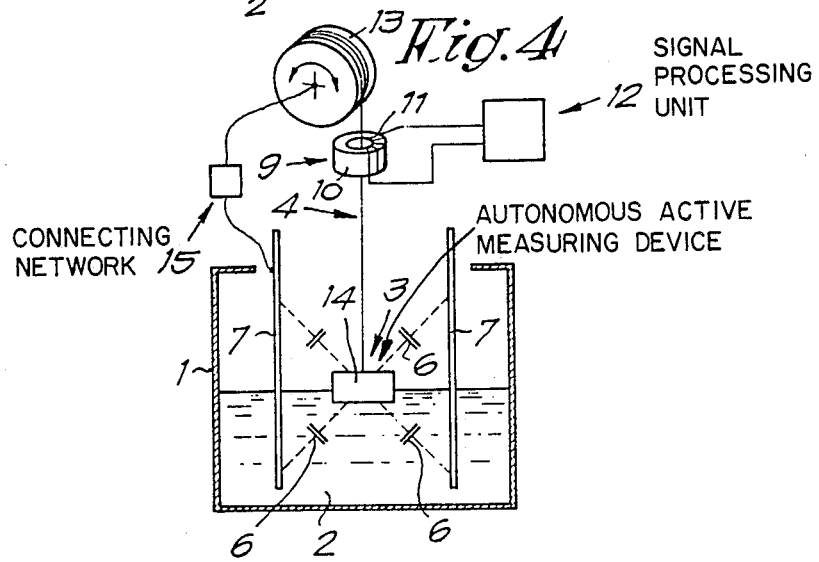

SYSTEM FOR DATA TRANSMISSION

BACKGROUND OF THE INVENTION

1. Field of the Invention

This invention pertains to a system for data transmission in a measuring instrument.

2. Description of the Prior Art

Known are systems for the transmission of data in a measuring instrument, whereby a measuring device is inserted in a medium in order to measure particular properties of it and whereby these measurement data are being sent out. These systems primarily consist of a measuring device, a measuring cable to which the measuring device is connected and a position measuring device. These known systems however have the disadvantage that the transfer of data inevitably is coupled with a physical or galvanic contact.

SUMMARY OF THE INVENTION

According to the present invention a system which excludes the disadvantages of such contact transfer is intended To reach this aim the present invention is related to a system making it possible to send measuring data, gathered by a measuring instrument, preferably equipped with sensors, via an electric conductive element and to store and process the measuring data, whereby the data transfer occurs between the electric conductive element and a signal processing unit without the need of a physical or galvanic contact.

The system according to the invention is especially suitable to be applied, in among others, level measuring devices with a float; servocontrolled level measuring devices with a plunger ; measuring devices with an ejector ; measuring devices for the measurement of qualities of liquids, such as temperature, pressure, conductivity, acidity, humidity, composition and so on.

The system for data transfer according to the invention offers among others, the following advantages :

applicable to all existing measuring devices with a float or a plunger without that the measuring device to be modified ;

with servocontrolled level measuring devices with a plunger it is suitable as well for point measurements, surface measurements, scans as for surface scanning through the medium or various media Whereof speCifiC quality properties have to be determined ;

the signal transfer remains, also without galvanic or physical contact ;

in applications whereby no contact is possible or permitted between the space wherein the medium to be inspected is located and the normal atmosphere, for instance, when defining quality properties of poisonous media or media under overpressure, the sensor can be inserted in or retra-cted out of the measuring environment via a lock mechanism, for instance via a globe valve ;

in applications where no signal transfer would be possible, for instance through the influence of the medium, measuring information, colleCted by the sensors, can be stored in a memory until the time the signal transfer can be reinstated ;

applications in which the quality properties of a medium or media ought to be measured in a loCation which can be defined freely at the time of the measurement and/or whereby the measuring signal itself will control the location definition.

More specifically the system is laid out for the transmission of data according to the invention, which shows the aforementioned and other advantages, mainly combined with an autonomous and active measuring device ; a freely movable electric conductive element to which the measuring device is connected ; a signal reception unit through which the electric conductive element, without making physical or galvanic contact, can move freely ; a signal processing unit which is connected electrically with the signal reception unit and a direct or indirect electrical connection between the electric conductive and the freely movable element and the medium to be inspected.

BRIEF DESCRIPTION OF THE DRAWINGS

In order to demonstrate the characteristics of the invention in a better manner, some preferred embodiments are described hereafter as an example without any restrictive character, with reference to the enclosed drawings, wherein :

FIG. 1 shows a very schematic outline of a system according to the invention ;

FIG. 2 schematically shows a variant of FIG. 1 ;

FIGS. 3 and 4 show two measurement systems in practice ;

FIG. 5 shows a cross section of a measuring device applied in the system according to the invention.

DETAILED DESCRIPTION OF THE PREFERRED EMBODIMENT

FIG. 1 shows a receptacle 1 containing a medium 2 with which the system for data transmission cooperates according to the invention. This system consists primarily of a main and a secondary electrical circuit of which the first one is formed by an autonomous and active measuring device 3 functioning as the signal source ; a freely movable electric conductive element 4, for instance a metallic rod, with which the measuring device 3 is connected and an electrical connection 5 consisting of the rod 4, the measuring device 3, the range capacity 6, a rod 7 and a connection 8, The secondary circuit is formed by a signal reception unit 9, for instance a magnetic ring core 10, equipped with a toroidal coil 11, through which the electric conductive element 4, without necessarily establishing a physical or galvanic contact, can move freely, and a signal processing unit 12 which is connected with a signal reception device 9 by means of the toroidal coil 11.

It is obvious that in this system the rod 4 will be suitably guided and that suitable means will be provided to keep the measuring device 3 in a given position.

The functioning of this system can easily be deduced from FIG. 1 and rests on the principle of the functioning of a transformer. The signal source 3 creates an electric current which will function as the primary winding of the transformer 9 via the metallic rod 4. By using a ring shaped transformer core 10 the magnetic connection with the secondary toroidal coil 11 will be optimal and indifferent to interfering and/or electric dispersion fields. The secondary current which is thus induced in the aforementioned secondary toroidal coil by the transformer's effect, is being amplified in the signal processing unit 12 and processed in a suitable manner.

Although the use of a ring shaped transformer core has preference, it is clear that other coil or core shapes, and even a rod core, are adequate for the receiving of the measuring signal.

In FIG. 2, another embodiment of a system according to the invention is depicted wherein the electric conductive and free movable element 4 consists of a metallic measuring wire. This measuring wire 4 is in this case wound around a position measuring device which is carried out in the shape of a drum 13, which is driven by means of a power device not represented in the figure, as for instance a step motor, a rotary permanent magnet with electromagnetic drive of another appropriate device, one and the other in such way that the measuring device 3 can be moved in a controlled way and that the relation between the rotary movement of the drum 13 and the vertical translation of the measuring device 3 is known.

As shown in FIG. 3, the position measuring device in a preferred embodiment, which is carried out in the shape of a drum 13, is being, by means of a direct electric connection, without using a connecting network 15, as shown in FIG. 1 or an indirect electric connection using a connecting network 15 as shown in FIG. 3. put into galvanic, capacitative or induction contact with the electrically conductive receptacle 1, in such way that the primary electric circuit of the transmission system according to the invention consists of the signal source 3, the electrically conductive measuring wire 4, the position measuring device 14, the connecting network 15 and the dispersion capacity 6 of the capacitor formed by the housing or a part of the housing of the signal source 3 and the electrically conductive receptacle 1. The secondary circuit of the transmission system according to the invention consists of the toroidal coil 11 which is positioned outside the field wherein the measuring device 3 can be moved, whereby this coil 11 is wound on the magnetic ring core 10 through which the measuring wire 4 can be led without physical or galvanic contact.

Furthermore the secondary circuit consists of the signal processing unit 12 which does not necessarily have to be positioned in the immediate proximity of the toroidal coil 11.

In FIG. 4 another embodiment of the system according to the invention is shown, in which the aforementioned dispersion cavity 6 is built up between the housing of the signal source 3 and an electrically conductive tube or rod 7 being introduced in the receptacle 1.

The operation is essentially identical to the operation already described above.

The measuring device 3, as found in FIG. 5, consists preferrably of a complete or partial electrically conductive housing 16, which on top is equipped with a central passage 17 through which a wire securing element 18 has been installed. Later is insulated from the housing 16 means of an element 19.

Within and/or through the aforementioned housing 16 one or more sensors 20 are provided for which transmit the signals to an autonomous and active measuring signal receiving unit 21, which in turn transmits the measuring signals to a signal converter 22 the signals in an appropriate manner and transmits the modulated transmission signal, on one hand, to the conductive parts of the housing and on the other hand, to the wire securing element 18, in such way that the primary electric circuit will be completed through the dispersion capacity 6, on one hand, and the measuring wire 4, on the other hand.

The aforementioned sensors 20, the measuring signal receiving unit 21 and the signal converter 22 can be supplied individually or jointly with energy, for instance by means of one or more batteries or any other form of power supply. Furthermore the measuring device desCribed above Can be completely surrounded by an electrically insulating layer 23, which obviously does not interfere with the dispersion capacity.

Under specific circumstances it may be desirable or required not to transmit the measuring signal to the signal processing unit, as for instance when plunging the measuring device 3 in a very heavy electrically conductive medium, as the medium itself would create an unacceptable primary signal load. In such cases the measuring device 3 can be equipped with a time recording unit and a memory in which according to a specific cyclic process, during a specific period of time the measuring data can be stored together with the time indication.

When defining the quantitative properties of materials, as for instance temperature, one must make a distinction between a direct measurement, on one hand, and an indirect measurement, on the other hand.

During a direct measurement, as shown on FIG. 2, the position measuring device 13 will bring the measuring device 3 to the required level of measurement. This position shall in most cases, coincide with the fluid level.

From this position, the measuring device 3 will transmit the measuring data via the measuring wire to the signal reception unit 9.

The position measuring device however can position the measuring deviCe 3 in another position as well, even beneath the fluid's surface, from which the measuring device 3 will then transmit its information.

As referred to previously it may be essential or required in specific circumstances that the measuring signals be momentarily stored in a memory together with the time indication. After completion of the measurement the position measuring device 13 will in that case pull the measuring device 3 out of the tested fluid and the stored data will be transmitted to the signal proCessing unit 12.

In order to synchronize the memory storage/transmission cycle, one may for instance make use of a magnet which can be positioned underneath the reOeption unit 9 and against which the measuring device 3 can be pulled upwards. The memory storage/transmission cycle can then be synchronized by means of an element at hand in the measuring device 3 which reacts to the presence of the magnet, for example by activating a switch.

The system for the synchronization of the memory storage/transmission cycle can also be used to make the measuring device 3 inactive for a specific period of time, with the purpose in mind to inCrease the lifespan of the power supply.

A similar controllability to make the measuring device inactive can be achieved by equipping the wire securing element 18 in the measuring device with a power or acceleration sensor.

The present invention is by no means restricted to the embodiments described as examples and represented in the drawings, but such a system for the transmission of data can be carried out in all possible combinations, forms and dimensions without going beyond the scope of the invention.

What is claimed is:

1. System for the transfer of data in a measuring instrument, whereby a measuring device is being introduced in a medium housed in a receptacle in order to measure specific properties of said medium and to transfer the measuring data, comprising: an autonomous active measuring device; a freely movable electrically conductive element to which the autonomous active measuring device is connected; a signal reception unit through which the electrically conductive element, without making a physical or galvanic contact, can move freely; a signal processing unit connected electrically to the signal reception unit; and an electrical connection located outside of said signal reception unit connecting the electrically conductive freely moveable element and the medium to be tested.

2. System according to claim 1, wherein the freely movable electrically conductive element comprises a rod.

3. System according to claim 1, wherein the freely movable electrically conductive element comprises a wire or a cable.

4. System according to claim 1, wherein the freely movable electrically conductive element is connected with a position measuring device.

5. System according to claim 4, wherein the position measuring device is constructed in the shape of a drum.

6. System according to claim 1, wherein the signal reception unit comprises a transformer composed of a magnetic core and a toroidal coil wound around it.

7. System according to claim 6, wherein the magnetic core is a ring core.

8. System according to claim 6, wherein the toroidal coil is connected with a signal processing unit.

9. System according to claim 1, wherein the freely movable electrically conductive element, is connected electrically with an electrically conductive body that is located in the medium to be tested.

10. System according to claim 1, wherein the freely movable electrically conductive element is connected electrically with an electrically conductive housing of the receptacle in which the medium to be inspected to located.

11. System according to claim 9, wherein the electric connection is established between the electrically conductive body, and, respectively, the receptacle in which the medium is located, and the position measuring device.

12. System according to claim 1, wherein a primary electric circuit of the signal reception unit comprises the autonomous active measuring device; the electrically conductive freely movable measuring element to which the autonomous active measuring device is connected; an electric connection comprising the electric connection between the electrically conductive freely movable measuring element and the electrically conductive element placed in the medium and an electrically conductive housing of the receptacle; and the range capacity of the capacitor which is being built up by the housing of the autonomous active measuring device and the electrically conductive element and the receptacle.

13. System according to claim 1, wherein a secondary electric circuit of the signal reception comprises a toroidal coil of a magnetic core and the signal processing unit.

14. System according to claim 1, wherein the autonomous active measuring device comprises an electrically conductive housing equipped with one or more sensors which are electrically connected with a measuring signal receiving unit which is in turn connected with a measuring signal converter electrically connected with the freely movable electrically conductive element.

15. System according to claim 14, wherein the measuring signal converter is connected electrically, on one hand, with the conductive parts of the electrically conductive housing, and, on the other hand, with the freely movable electrically conductive element (4).

16. System according to claim 14, wherein said sensors are placed within an electrically conductive housing.

17. System according to claim 14, wherein said sensors reach through an electrically conductive housing to the outside of said housing.

18. System according to claim 14, wherein the autonomous active measuring device is completely surrounded by an electrically insulating layer.

19. System according to claim 14, wherein the autonomous active measuring device contains a memory.

20. System according to claim 14, wherein the autonomous active measuring device contains a time recording unit.

* * * * *